(12) United States Patent
Brooks

(10) Patent No.: US 7,448,691 B2
(45) Date of Patent: Nov. 11, 2008

(54) MOWER PAYLOAD BIN

(75) Inventor: Kenny M. Brooks, Wilkesboro, NC (US)

(73) Assignee: KB Mowers, LLC, Wilkesboro, NC (US)

( * ) Notice: Subject to any disclaimer, the term of this patent is extended or adjusted under 35 U.S.C. 154(b) by 125 days.

(21) Appl. No.: 11/067,658

(22) Filed: Feb. 25, 2005

(65) Prior Publication Data

US 2006/0192359 A1    Aug. 31, 2006

(51) Int. Cl.
*B60P 1/24* (2006.01)
(52) U.S. Cl. .................... 298/17 T; 298/3; 56/DIG. 9
(58) Field of Classification Search ............ 298/2, 298/3, 5, 17 R, 17 T, 1 A, 1 C; 56/202–206, 56/DIG. 9
See application file for complete search history.

(56) References Cited

U.S. PATENT DOCUMENTS

| 1,338,144 | A |   | 4/1920  | McNeill |
| 2,326,739 | A |   | 8/1943  | Andrews |
| 3,847,436 | A |   | 11/1974 | Reid |
| 4,372,064 | A |   | 2/1983  | Benenate et al. |
| 5,064,338 | A |   | 11/1991 | Lawrence |
| 5,533,676 | A |   | 7/1996  | Conley |
| 5,761,887 | A |   | 6/1998  | Hanson |
| 5,992,134 | A |   | 11/1999 | Blide et al. |
| 6,029,312 | A | * | 2/2000  | Whitney |
| 6,318,808 | B1 | * | 11/2001 | Shayne ............ 298/17 B |
| 6,502,771 | B1 |   | 1/2003  | Wyne |

FOREIGN PATENT DOCUMENTS

DE      42 26 969 A1    2/1994

* cited by examiner

*Primary Examiner*—Stephen Gordon
(74) *Attorney, Agent, or Firm*—Alston & Bird LLP

(57) ABSTRACT

The present invention is directed to a payload bin assembly that is stably coupled to zero-turn and non-zero-turn mowers alike. In various embodiments, the payload bin assembly is comprised of a durable payload support frame having a first end and a second end. A payload bin is pivotally coupled proximate the first end of the payload support frame. The payload support frame is supported at its first and second ends by a wheel-based support assembly and a mower-based support assembly, respectively.

13 Claims, 7 Drawing Sheets

MOWER PAYLOAD BIN

BACKGROUND OF THE INVENTION

1. Field of the Invention

This invention relates generally to lawn mower accessories and, more particularly to a front-mounted payload bin for a zero-turn lawn mower.

2. Description of the Related Art

The design and operation of commercial and residential lawn mowers has changed considerably over the years. Early spinning wheel push-mowers have evolved into the extremely maneuverable, self-powered, high-horse power riding mowers of today. Perhaps the most maneuverable of modern lawn mowers is the "zero-turn" mower depicted in FIG. 1. Zero-turn mowers 10 include a maneuverable rear wheel drive system that accommodates "transmission steering," that is, the mower turns by controlling the rotation of the drive wheels 45 relative to one another. The term "zero-turn" refers to the turning radius of the mower. By reversing or holding stationary one of the mower's drive wheels 45, a zero-turn mower 10 requires very little, if any, forward displacement (e.g., substantially zero inches) to turn 180 degrees. Turning sharply in this regard requires front wheels 22, 23 that are generally structured as freely rotatable, castor-type, wheels as shown. A frame assembly 15 couples the front wheels 21, 22 to the rear or drive wheels 45 of the mower. In the depicted application, the frame assembly 15 includes first and second deck support brackets 20, 21 that are configured to support a mowing deck 30 as shown.

The increased maneuverability of zero-turn mowers allow commercial and residential consumers to create manicured lawns of ever increasing complexity. However, zero-turn mowers are generally not adaptable to assist consumers in other lawn care endeavors. For example, zero-turn mowers are not typically desirable for towing trailers or other payload bins. The maneuverability of zero-turn mowers, while an advantage when cutting grass, may cause conventional towed trailers to flip or jackknife when the mower turns sharply. This fact often forces consumers to forego the increased maneuverability of a zero-turn mower in favor of the flexibility and practicality of conventional, less-maneuverable, riding lawn mowers. Alternatively, consumers wishing to achieve the dual goals of high maneuverability and acceptable towing capacity may be forced to undertake the prohibitive expense of using two pieces of expensive machinery for each goal, namely, a zero-turn mower for mowing and a conventional mower for hauling.

Thus, there is a need for a zero-turn mower accessory that improves the flexibility and practicality of zero-turn mowers by allowing such mowers to efficiently accept and transport a payload of earth, mulch, or other materials. In particular, the accessory should be structured such that the accessory can be stably coupled and operable with a zero-turn lawn mower without flipping or jack-knifing. The accessory should provide a robust and durable payload bin assembly that is capable of routinely supporting significant payloads weighing in excess of several hundred pounds. The accessory should also be readily adaptable for attachment to a variety of zero-turn and non-zero-turn mower configurations.

BRIEF SUMMARY OF THE INVENTION

The present invention is directed to a payload bin assembly that is stably coupled to zero-turn and non-zero-turn mowers alike. In various embodiments, the payload bin assembly is comprised of a durable payload support frame having a first end and a second end. A payload bin is pivotally coupled to the payload support frame adjacent its first end. The payload support frame is supported at one end by a wheel-based support assembly and at the other end by a mower-based support assembly. In one embodiment, the wheel-based support assembly supports a substantial portion of the weight of the payload while the mower-based support assembly stably couples the payload bin assembly to the mower.

In one embodiment, the mower-based support assembly is pivotally attached to the payload support frame thereby allowing the payload bin assembly to pivot relative to the mower as the mower encounters uneven terrain. In another embodiment, the mower-based support is comprised of a lateral support, one or more vertical supports, and at least one cross-coupler for adjustably coupling the one or more vertical supports to the lateral support. The lateral supports, vertical supports, and cross-couplers are structured to cooperate with one another to thereby provide horizontal and vertical adjustability to the mower-based support assembly such that the payload bin assembly can be readily attached to mowers having differing heights and widths. In still another embodiment, the vertical supports are rotatably coupled to first and second L-shaped brackets that are structured to securely receive one or more mower attachment components.

In yet another embodiment, the wheel-based support assembly is structured to define an adjustable payload support height. The wheel-based support assembly is comprised of at least one payload support wheel coupled to at least one wheel support structure. In one embodiment, the wheel support structure includes a wheel support frame coupled to the payload support frame and a wheel support arm slidably coupled to the wheel support frame at one end and rotatably coupled to the payload support wheel at the other. In another embodiment, the wheel support arm is configured to receive one or more cylindrical shims of differing lengths for purposes of adjusting the payload support height.

Accordingly, the present invention provides a zero-turn mower accessory that improves the flexibility and practicality of zero-turn mowers by allowing such mowers to efficiently accept and transport a payload of earth, mulch, or other materials. In particular, the accessory is stably coupled to and operable with a zero-turn lawn mower. The accessory provides a robust and durable payload bin assembly that is capable of routinely supporting significant payloads weighing in excess of several hundred pounds. Finally, the accessory is readily adaptable for attachment to a variety of zero-turn and non-zero-turn mower configurations.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Figure 1:
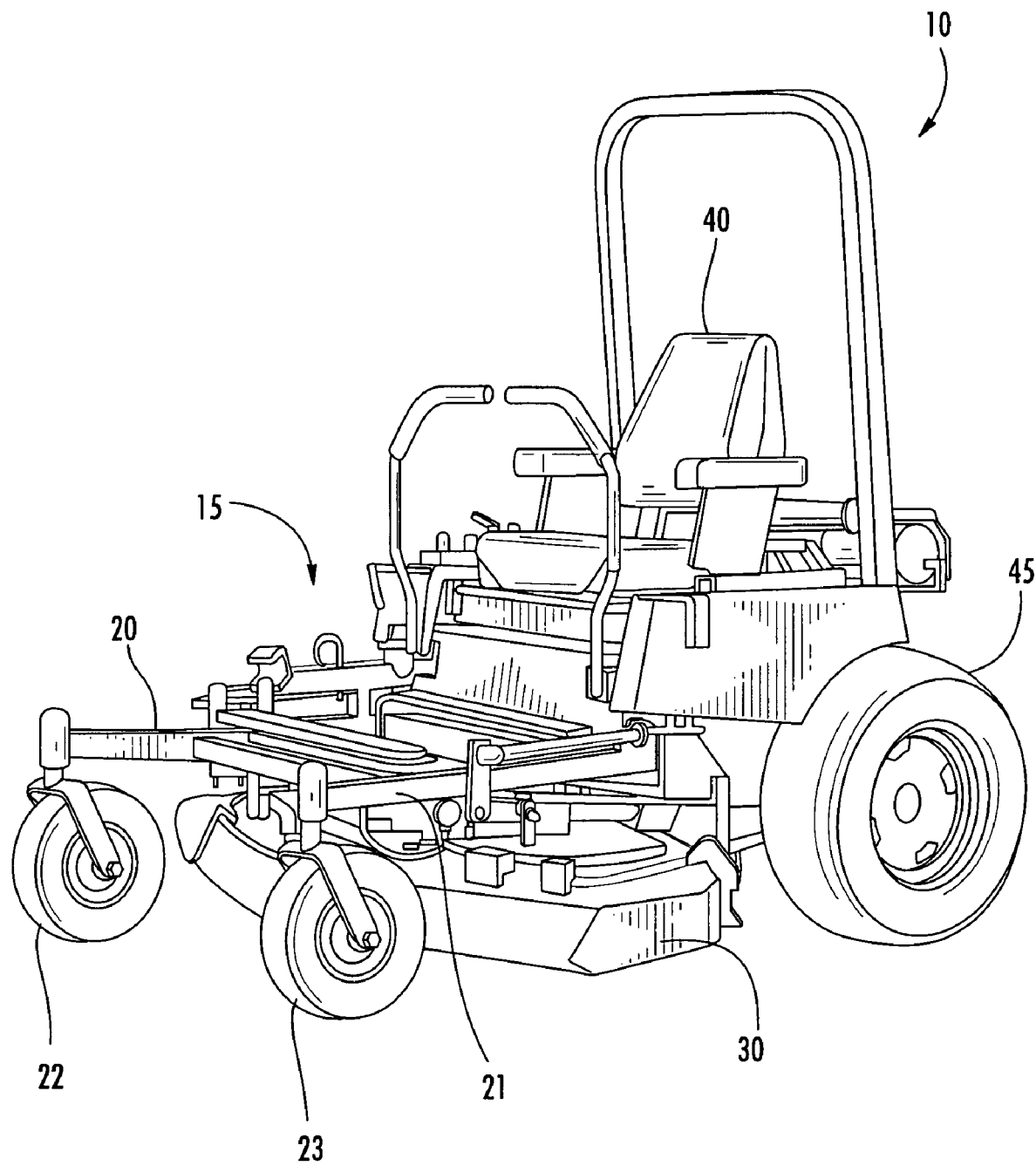
FIG. 1 is a perspective view of a conventional "zero-turn" mower as known in the prior art.
Figure 2:
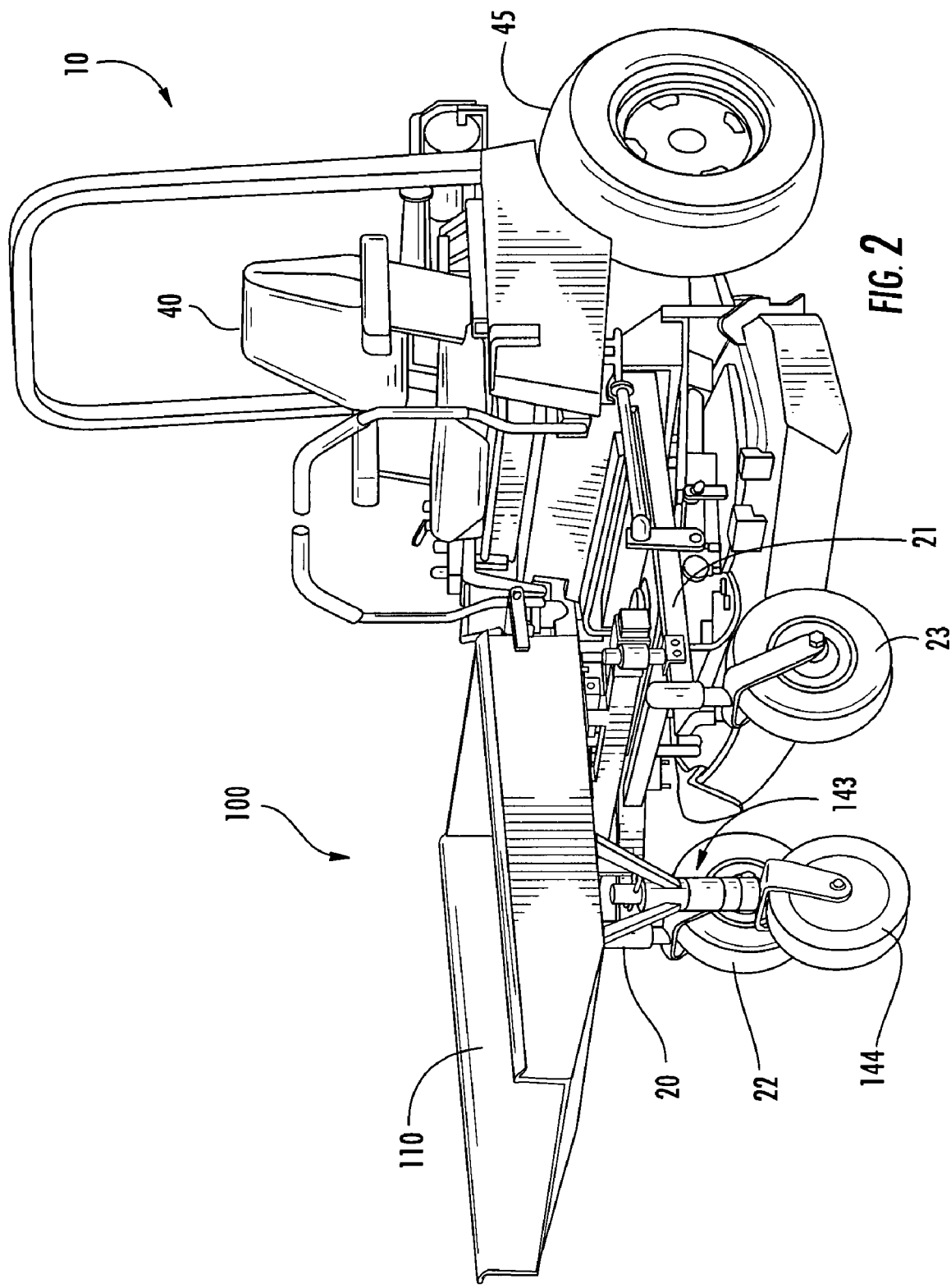
FIG. 2 is a perspective view of a payload bin assembly coupled to a zero-turn mower according to one embodiment of the present invention.
Figure 3:
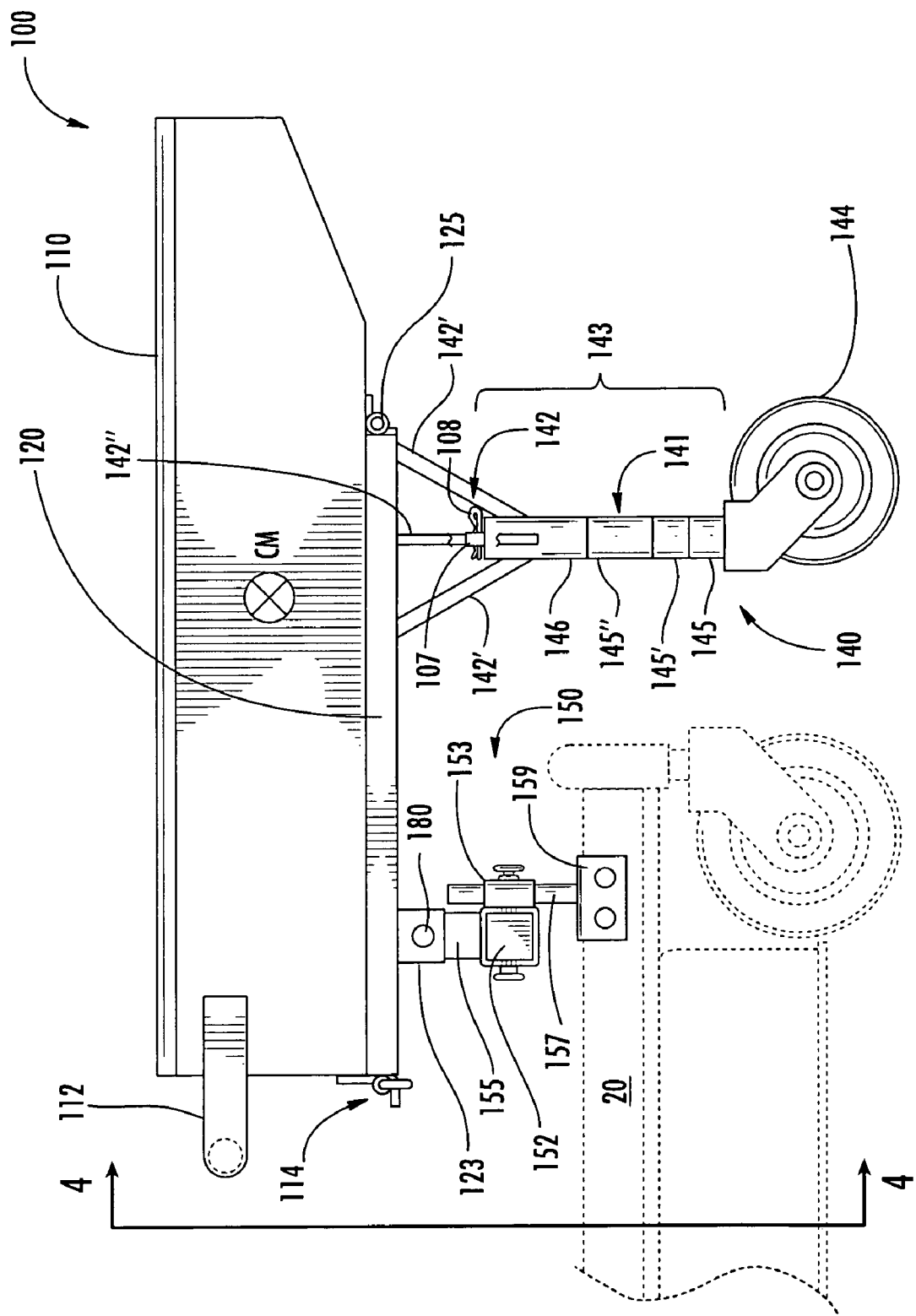
FIG. 3 is a side view of a payload bin assembly coupled to a zero-turn mower according to one embodiment of the present invention.

Referring to FIGS. 2 and 3, there is illustrated a payload bin assembly 100 coupled to a zero-turn mower 10 in accordance with one embodiment of the present invention. In the depicted embodiment, the payload bin assembly 100 is comprised of a payload bin 110, a wheel-based support assembly 140, and a mower-based support assembly 150. The payload bin 110 is structured to accept, transport, and dump payloads of earth, mulch, and other materials. The payload bin 110 is pivotally supported by a payload support frame 120 as shown. Unlike conventional payload bins or trailers, the payload bin assemblies of the present invention are uniquely adapted for use with zero-turn mowers or other similar sharply turning lawn mowers. It is noted, however, that the improved payload assemblies of the present invention are not limited to use with zero-turn mowers and may, in fact, be readily adapted for use with a variety of non-zero-turn mowers. For example, one non-zero-turn embodiment is described in conjunction with FIGS. 7 and 7A below.

Returning to the embodiments of the present invention depicted in FIGS. 2-6, the payload bin assembly 100 is supported at least partially by a wheel-based support assembly 140 as shown. The wheel-based support 140 assembly comprises a payload support wheel 144 and a wheel support structure 143. In the depicted embodiment, the wheel-based support assembly 140 is structured to support a substantial portion of the weight attributable to the payload bin assembly 100 and associated payload through the wheel mount assembly 143 and payload support wheel 144. Accordingly, the mower-based support assembly 150 (and, thus, the mower) is left to support a relatively smaller portion of the total payload assembly weight. In this regard, the payload bin assembly 100 of the present invention is structured to limit any adverse impact on mower operation or fuel economy. The precise weight distribution attributable to any given payload may change per application depending upon the relative uniform or non-uniform loading of the payload as will be apparent to one of ordinary skill in the art.

As explained above, the mower-based support assembly 150 operates mainly to couple the payload bin assembly 100 to the mower 10. In this regard, the mower-based support assembly 150 is preferably structured to couple and adapt to a variety of mower configurations. In one embodiment, this adaptability is derived largely from the horizontal, vertical, and pivotal flexibility of the mower attachment components (e.g., lateral support, cross-couplers, vertical supports, etc.) as described more fully below.

In one embodiment, the mower-based support assembly 150 is comprised of a lateral support 152, first and second cross-couplers 153, 154, and first and second vertical supports 157, 158. The first and second vertical supports 157, 158 terminate into first and second support feet 159, 160 as shown. The lateral support 152 cooperates with the first and second vertical supports 157, 158 via the first and second cross-couplers 153, 154 to provide horizontal and vertical adjustment of the mower-based support assembly 150. Such adjustment advantageously allows the payload bin assembly 100 to adapt to a variety of mower attachment configurations. More particularly, the flexibility of the mower-based support assembly 150 allows the payload bin assemblies of various embodiments of the invention to attach to zero-turn and non-zero-turn mowers having a variety of heights and widths.

Figure 4:
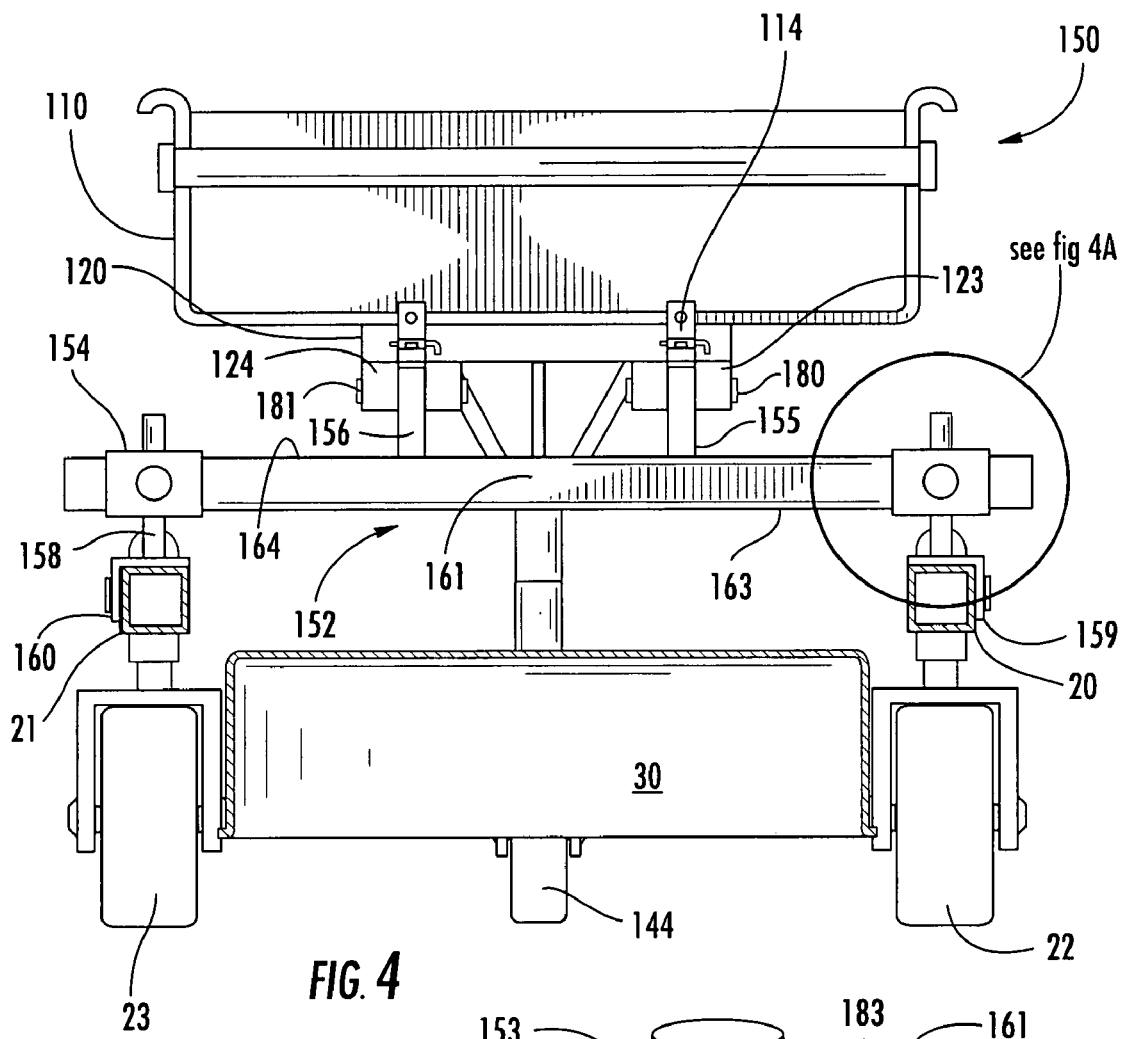
FIG. 4 is a rear view of a payload bin assembly coupled to a zero-turn mower in accordance with one embodiment of the present invention.

In one embodiment, the mower-based support assembly further includes pivotable first and second support feet 159, 160 as illustrated in FIG. 4. The depicted support feet 159, 160 are generally L-shaped brackets and are structured to releasably couple to first and second deck supports 20, 21 (i.e., square tubing, bars, etc.) regardless of their size, shape, and orientation. The first and second support feet 159, 160 are removably coupled to the first and second deck supports 20, 21 by pins, screws, bolts, clamps, or other similar mechanical fasteners, as is known in the art. In other embodiments, the support feet 159, 160 may be attached to alternate anchoring components of the mower (such as planar or non-planar operator foot plates, mower decks, etc., not shown). Although depicted as L-shaped brackets, other support feet structures may be readily adopted, depending upon the structure of the mower attachment application, as will be apparent to one of ordinary skill in the art.

Apart from its horizontal and vertical attachment flexibility, the mower-based support assembly 150 includes a pivot structure that ensures that the payload bin assembly 100 remains pivotable relative to the mower. In one embodiment as illustrated in FIGS. 3 and 4, the payload support frame 120 includes first and second pivot couplers 123, 124 that are configured to pivotally receive first and second tabs 155, 156 that extend from the lateral support 152. In the depicted embodiment, the first and second pivot couplers 123, 124, and the first and second tabs 155, 156, define aligned apertures for receiving first and second pins 180, 181. In other embodiments, a variety of additional pivot coupling devices known in the art may be used for pivotally securing the payload support frame 120 to the lateral support 152.

The tabs 155, 156 of the lateral support 152 extend into a generally horizontal member 161 having first and second ends. First and second horizontal adjustment areas 163, 164 are defined adjacent the first and second ends, respectively, of the horizontal member 161, as shown in FIG. 4. In one embodiment, the horizontal member 161 of the lateral support 152 is structured and positioned so as to extend the full width of the front portion of the zero-turn mower for added stability. The first and second adjustment areas 163, 164 of the horizontal member 161 are received by the first and second cross-couplers 153, 154.

Figure 4A:
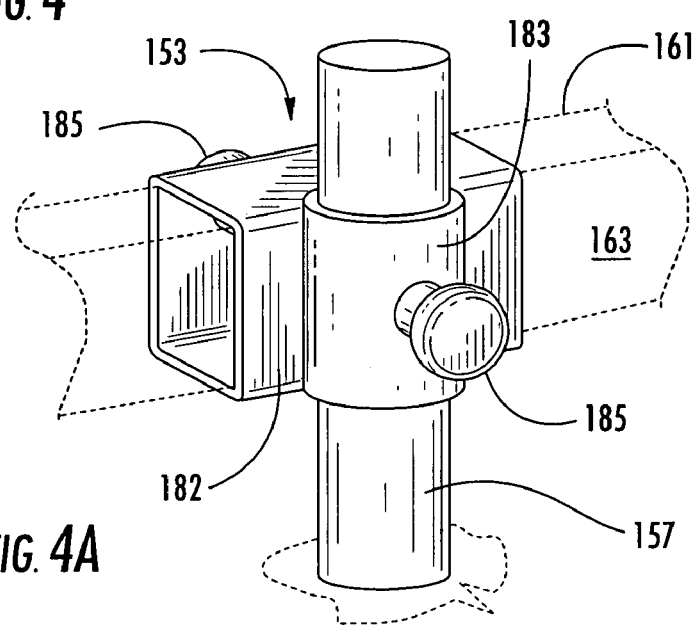
FIG. 4A is an isometric view of an exemplary cross-coupler according to one embodiment.

An exemplary cross-coupler is illustrated in FIG. 4A. To simplify the foregoing description the depicted cross-coupler is referred to as a first cross-coupler; however, as will be apparent to one of ordinary skill in the art, the foregoing description may just as easily apply to the second cross-coupler. In the depicted embodiment, the first cross-coupler 153 (and the second cross-coupler 154, although not shown in FIG. 4A) is comprised of transversely aligned first and second sleeves 182, 183. In one embodiment, the first sleeve 182 of the first cross-coupler 153 is configured to receive the first adjustment area 163 of the horizontal member 161, and the second sleeve 183 of the first cross-coupler is configured to receive the first vertical support 157. In the depicted embodiment, the first and second sleeves 182, 183 of the first and second cross-couplers 153, 154 are rigidly joined or welded to maintain a perpendicular relationship between the horizontal member 161 of the lateral support 152 and the vertical supports 157, 158. In one embodiment, the cross-couplers include tightening screws 185 or other similar mechanical fasteners that allow horizontal and vertical adjustment of the horizontal and vertical members, when loosened, and prevent such adjustment when tightened. In this regard, the mower-based support assembly 150 is attachable to mowers having a variety of heights and widths.

Referring to FIG. 3, the wheel-based support assembly 140 is structured to support a substantial portion of the weight provided by the payload bin assembly 100. In one embodiment, this weight distribution is assured, at least for unfilled or evenly distributed payloads, by positioning the wheel-based support assembly 140 generally proximate to the center mass CM of an unfilled payload bin 110. In the depicted embodiment, the wheel-based support assembly 140 is comprised of a payload support wheel 144 and a wheel support structure 143. The depicted wheel support structure 143 is comprised of a wheel support frame 142 and a wheel support arm 141 of adjustable height. The payload support wheel 144 is freely rotatable about the wheel support arm 141 to accommodate the increased maneuverability of zero-turn mowers.

In one embodiment, the wheel support frame 142 is comprised of two v-shaped support members 142', 142" that converge downwardly into a cylindrical collar 146. In the depicted embodiment, the height of the wheel support arm 141 and/or the payload support height is adjusted by adding or removing cylindrical shims 145, 145', 145" of various heights from a central rod 107. The removable shims 145, 145', 145" have a diameter that is substantially equal to the diameter of the cylindrical collar 146. In one embodiment, the central rod 107 is rotatably attached at one end to the payload support wheel 144. The rod 107 defines an aperture adjacent an opposite end for receiving a pin 108. As illustrated in FIG. 3, support member 142" has been partially sectioned to better illustrate the central rod 107 and pin 108 engagement. During operation, the rod 107 is positioned through the removable shims 145, 145', 145" and the cylindrical collar 146 and the pin 108 is inserted into the rod 107, thus, locking the shims 145, 145', 145" between the cylindrical collar 146 and the payload support wheel 144. To remove one or more shims and adjust the wheel arm height, an operator simply removes the pin 108 from the central rod 107, pulls the rod 107 through the cylindrical collar 146, and removes the desired number of shims. Any removed shims are then positioned on top of the cylindrical collar 146 and the pin 108 is replaced into the rod 107 above the re-positioned shim, thereby locking the re-positioned and non-re-positioned shims in place. In this regard, a new wheel arm height and/or payload support height may be set as will be apparent to one of ordinary skill in the art.

In other embodiments, the payload support wheel 144 may be coupled to the payload support frame 120 via a variety of other techniques that may become apparent to those of ordinary skill in the art in view of the above disclosure. For example, in one embodiment, the wheel support arm 141 may be replaced by a spring-based, hydraulic, or pneumatic shock absorber assembly (not shown). In other embodiments, a simple pipe, set of forks, or non-adjustable frame (not shown) may couple the payload support wheel to the payload support frame without deviating from the inventive concepts described herein.

In other embodiments of the invention, the wheel-based support assembly may include two payload support wheels rotatably coupled to two payload support structures rather than the single-wheel configuration described above. Such embodiments may provide additional balance and support for heavy-duty or sloped terrain applications. Dual or single wheel embodiments according to various embodiments of the present invention may support payloads exceeding 500 pounds. The precise suggested payload may vary between applications depending on a variety of factors including the particular design specifications selected for the payload bin, the one or more wheel support structures, and the one or more payload support wheels as will be apparent to one of ordinary skill in the art.

Figure 5:
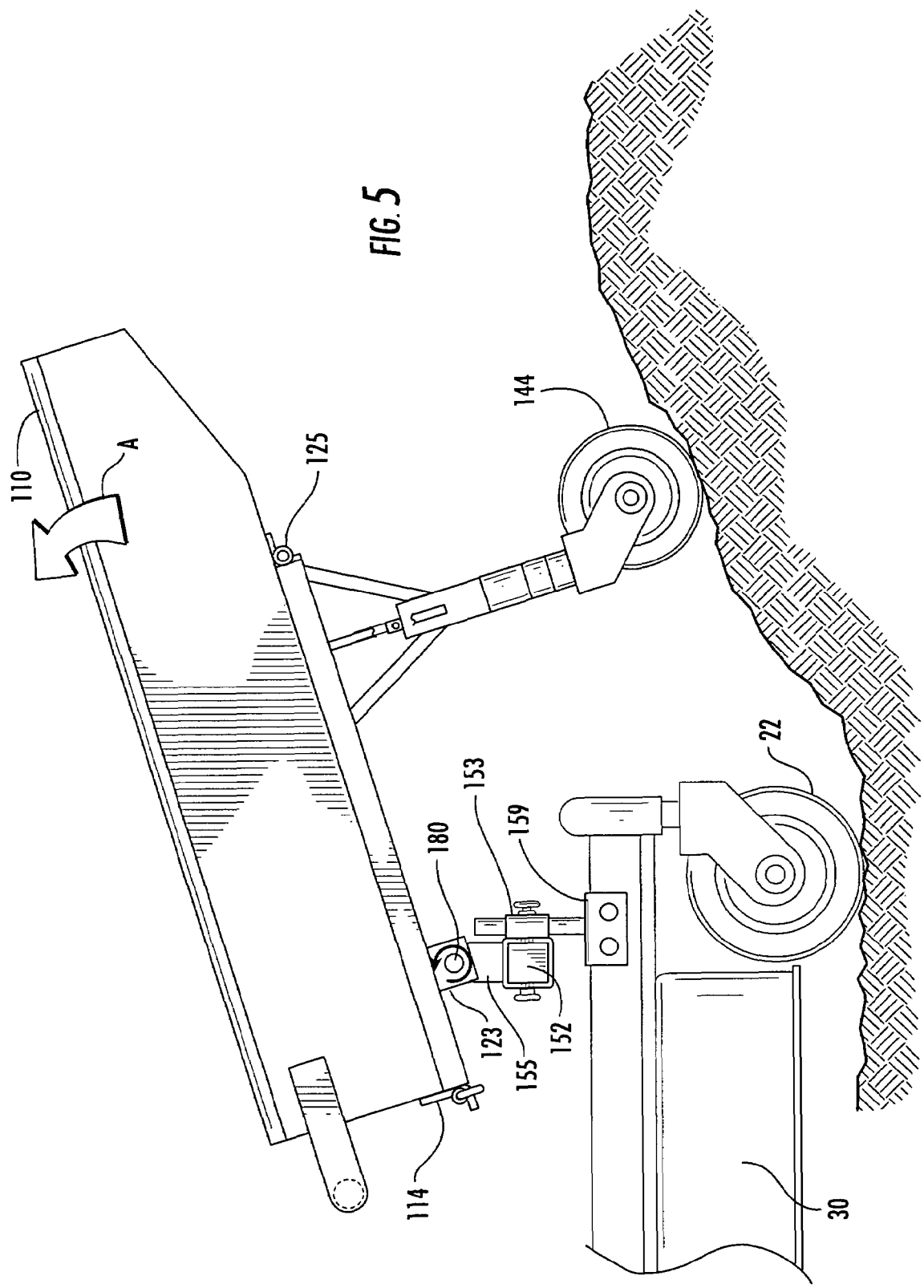
FIG. 5 is a side view of a pivotable payload bin assembly configured to travel uneven terrain in accordance with one embodiment of the present invention.

FIG. 5 illustrates pivotal coupling of the mower-based support assembly 150 to the payload support frame 120, according to one embodiment of the present invention. In the depicted embodiment, the payload support frame 120 pivotally attaches to the first and second tabs 155, 156 of the lateral support 152 via first and second pivot couplers 123, 124. In the depicted embodiment, the first and second pivot couplers 123, 124 and the first and second tabs 155, 156 define aligned holes for receiving first and second pins 180, 181. This configuration allows the payload bin assembly 100 of the present invention to pivot relative to the mower as the payload support wheel 144 encounters uneven terrain. When encountering hills, for example, the payload bin is allowed to pivot upwardly (i.e., counter-clockwise) along the pivot arrow A shown in FIG. 5. Alternatively, as the payload support wheel 144 encounters valleys in the terrain relative to the mower, the payload bin assembly 100 is allowed to pivot in a clockwise direction relative to the mower (not shown). Advantageously, this configuration reduces wear and strain transmitted through the mower-based support assembly 150 and into the mower.

Alternate structures may be used to ensure that the mower-based support assembly 150 remains pivotable relative to the mower. For example, in one embodiment (not shown), the lateral support 152 may be rigidly attached to the payload support frame 120 without a pivot hinge (not shown); however, the first and second adjustment portions of the lateral support may have a circular configuration (rather than the rectangle configuration shown) and structured to rotate freely within a similarly circular-configured horizontal sleeve defined by the first and second cross-couplers. In this embodiment, one or more bearings may be provided to further assist the pivoting relationship between the lateral support and the first and second cross-couplers.

In another embodiment (not shown), a pivotable mower-based support assembly may be achieved by omitting the cross-couplers and vertical supports described above and pivotally coupling the horizontal member of the lateral support to a generally planar operator foot support for a zero-turn mower. In one embodiment, such pivotal coupling may be achieved by using one or more U-bolts as a fastener for attaching the horizontal member to the foot support.

Figure 6:
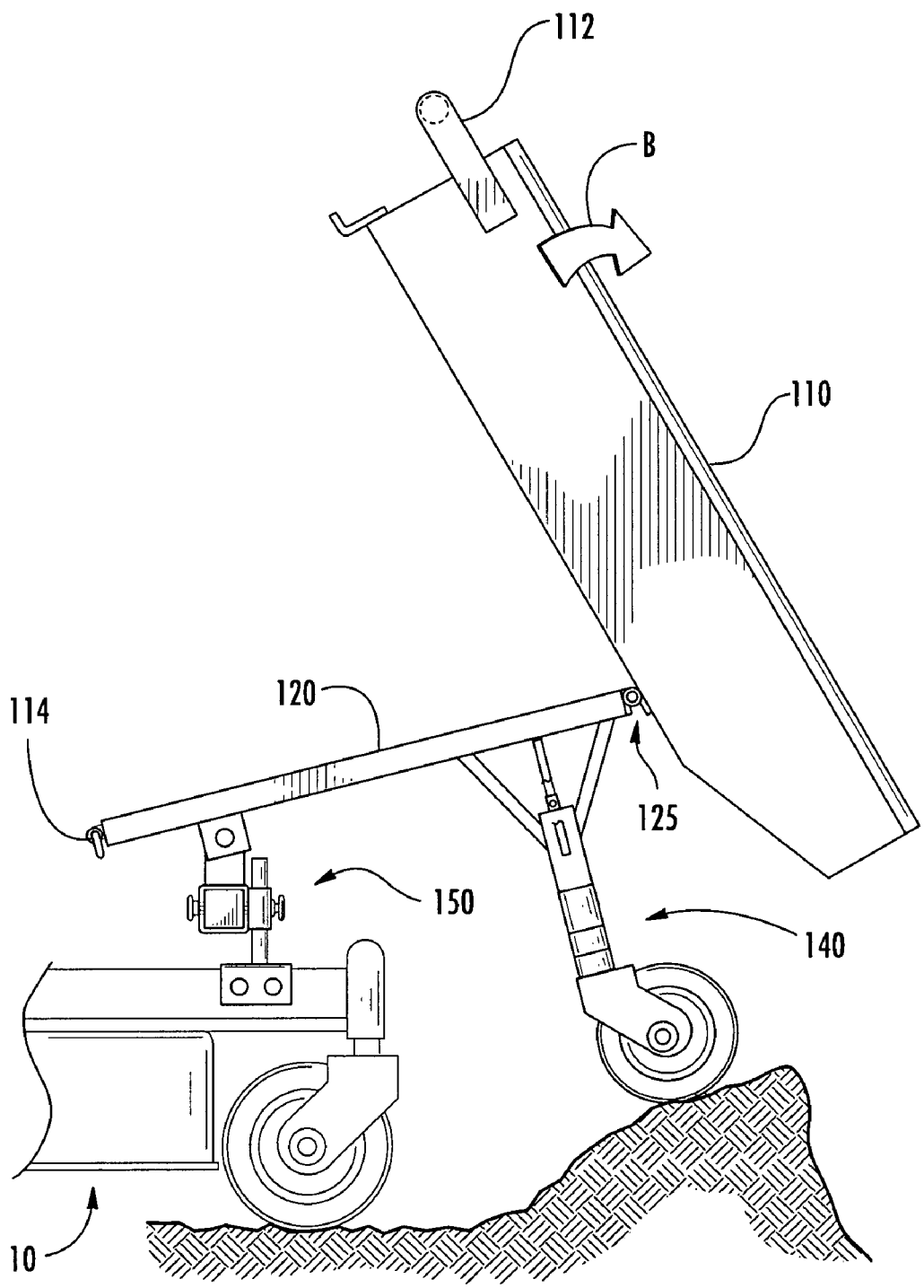
FIG. 6 is a side view of a payload bin assembly configured for forward dumping in accordance with one embodiment of the present invention.

In still another embodiment, the payload bin assembly 100 includes a payload support frame 120 that is securely attached to the mower-based support assembly 150 and wheel-based support assembly 140. The payload support frame 120 is configured to pivotally support the payload bin 110 for dumping or unloading a given payload as illustrated in FIG. 6. In the depicted embodiment, the payload bin 110 is pivotally coupled to the payload support frame 120 by a payload hinge 125. Thus, an operator may grasp a handle 112 extending from the payload bin 110 to dump or pour the contents of the bin forwardly as shown by Arrow B. In various embodiments, one or more payload latches 114 are provided generally adjacent the rear end of the payload support frame 120 for securing the payload bin 110 in a locked position until dumping is desired. In other embodiments, the payload hinge 125 may be spring biased to assist an operator in dumping heavy payloads.

Figure 7:
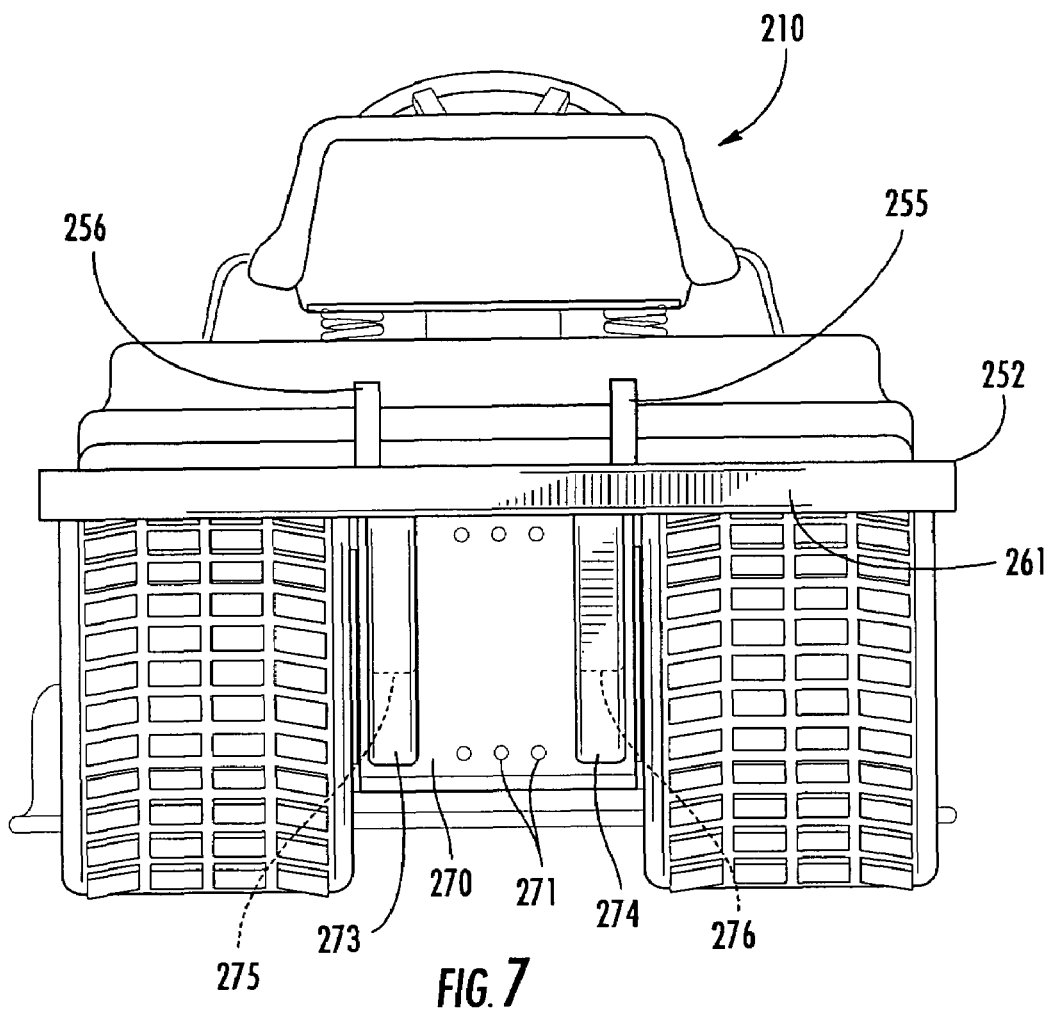
FIG. 7 is a rear view of a mower-based support assembly structured for attachment to the rear end of a non-zero-turn mower in accordance with another embodiment of the present invention.
Figure 7A:
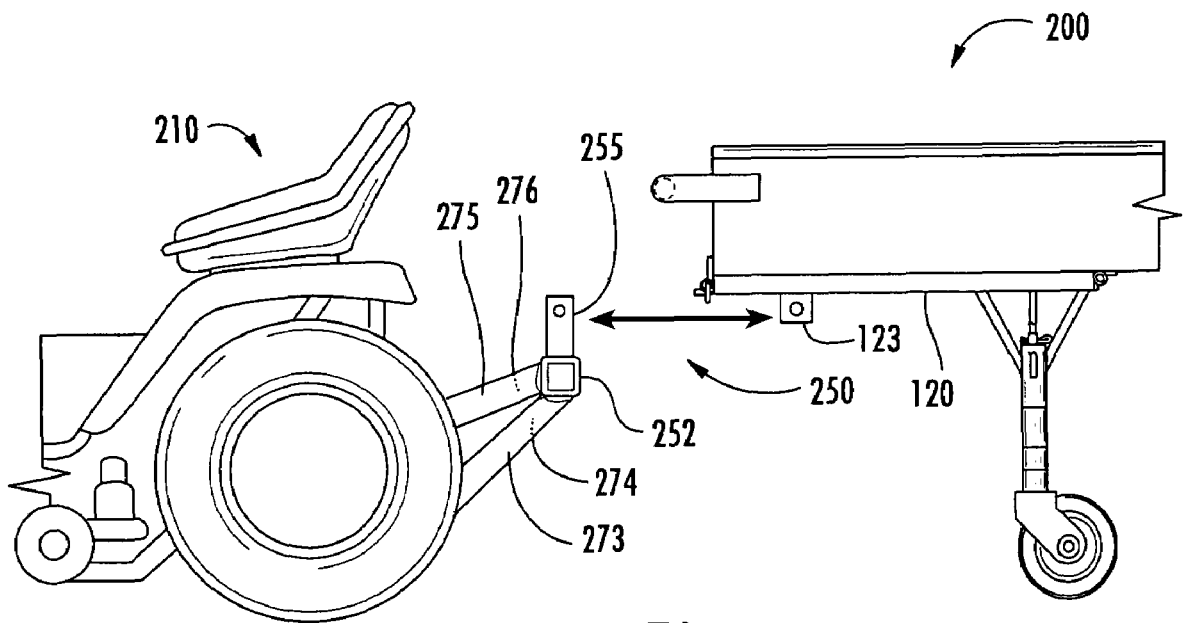
FIG. 7A is a side view of a payload bin assembly configured for attachment to the mower-based support assembly depicted in FIG. 7, according to another embodiment of the present invention.

FIGS. 7 and 7A illustrate a payload bin assembly 200 in accordance with yet another embodiment of the invention. The depicted payload bin assembly 200 includes a mower-based support assembly 250 structured for attachment to the rear end of a conventional, non-zero-turn mower 210. In one embodiment, the mower-based support assembly 250 comprises a coupling plate 270, a plurality of angled supports 273, 274, 275, 276, and a lateral support 252. The depicted coupling plate 270 is secured to the rear end of the mower 210 via one or more screws, bolts, clamps, or other similar fasteners 271. The angled supports 273, 274, 275, 276 may be comprised of durable pipe, tubing, rods or other similar materials, provided such materials have the strength and durability to support the weight of the payload bin assembly 200 and associated payload. The angled supports 273, 274, 275, 276 are configured to extend upwardly from the coupling plate 270 to rigidly secure the lateral support 252 in position to receive the payload bin assembly 200 as shown.

The lateral support 252 includes upwardly extending first and second tabs 255, 256 that are structured similarly to those (155, 156) described in FIG. 3 above. The tabs 255, 256 are structured in this way to receive the downwardly extending first and second pivot couplers 123, 124 of the payload support frame 120 as shown. Once again, pins (not shown) are disposed into the aligned apertures of the first and second tabs 255, 256 and the first and second pivot couplers 123, 120 to ensure the payload bin assembly 200 remains pivotable relative to the mower 210. Thus, the present invention advantageously provides mower-based support assemblies and, thus, payload bin assemblies, adapted for efficient coupling to zero-turn and non-zero-turn mowers alike.

Many modifications and other embodiments of the inventions set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A payload bin assembly for a mower comprising:
a payload support frame having a first end and a second end;
a payload bin pivotally coupled proximate to said first end of said payload support frame;
a wheel-based support assembly coupled proximate to said first end of said payload support frame; and
a mower-based support assembly coupling said second end of said payload support frame to the mower,
wherein said mower-based support assembly is comprised of a lateral support, at least one vertical support, and at least one cross-coupler for adjustably coupling said at least one vertical support to said lateral support.

2. The payload bin assembly of claim 1, wherein said at least one vertical support comprises first and second vertical supports, and said at least one cross-coupler comprises first and second cross-couplers that are configured for adjustably coupling said first and second vertical supports to said lateral support.

3. The payload bin assembly of claim 2, wherein said mower-based support assembly further comprises first and second support feet structured to attach said mower-based support assembly to the mower, and wherein each of said first and second vertical supports are rotatably coupled to a corresponding one of said first and second support feet.

4. The payload bin assembly of claim 2, wherein said mower-based support assembly further comprises first and second support feet structured to attach said mower-based support assembly to the mower, and wherein each of said fist and second vertical supports are pivotally coupled to a corresponding one of said first and second support feet.

5. The payload bin assembly of claim 1, wherein said mower-based support assembly is removably coupled to the mower.

6. The payload bin assembly of claim 5, wherein said payload support frame defines first and second pivot couplers for releasably and pivotally coupling said payload support frame to said lateral support.

7. The payload bin assembly of claim 1, wherein said at least one vertical support comprises first and second vertical supports that are structured for releasable attachment to the mower, wherein said lateral support defines first and second ends, said lateral support is pivotally coupled to said payload support frame, and wherein each of the first and second vertical supports are adjustably coupled proximate to a corresponding one of the first and second ends of said lateral support.

8. The payload bin assembly of claim 7, wherein said wheel-based support assembly includes a payload support wheel and wherein the payload bin assembly is configured to pivot relative to the mower as said payload support wheel encounters uneven terrain.

9. The payload bin assembly of claim 7, wherein said wheel-based support assembly is structured to define an adjustable payload support height.

10. The payload bin assembly of claim 7, wherein said at least one cross-coupler comprises first and second cross-couplers, and wherein each of the first and second vertical supports are adjustably coupled to said lateral support via a corresponding one of the first and second cross-couplers.

11. The payload bin assembly of claim 7, wherein said mower-based support assembly further comprises first and second support feet structured to securely attach the mower-based support assembly to the mower, and wherein each of the first and second vertical supports are coupled to a corresponding one of the first and second support feet.

12. The payload bin assembly of claim 7, wherein said mower-based support assembly further comprises first and second support feet structured to securely attach the mower-based support assembly to the mower, and wherein each of the first and second vertical supports are pivotally coupled to a corresponding one of the first and second support feet.

13. The payload bin assembly of claim 7, wherein said mower-based support assembly is configured to couple said second end of said payload support frame to a zero-turn mower.

* * * * *

UNITED STATES PATENT AND TRADEMARK OFFICE
CERTIFICATE OF CORRECTION

| | |
|---|---|
| PATENT NO. | : 7,448,691 B2 |
| APPLICATION NO. | : 11/067658 |
| DATED | : November 11, 2008 |
| INVENTOR(S) | : Brooks |

It is certified that error appears in the above-identified patent and that said Letters Patent is hereby corrected as shown below:

<u>Column 8,</u>

Line 18, "fist" should read --first--.

Signed and Sealed this

Seventeenth Day of March, 2009

JOHN DOLL
*Acting Director of the United States Patent and Trademark Office*